United States Patent [19]

Poyet et al.

[11] Patent Number: 5,176,785
[45] Date of Patent: Jan. 5, 1993

[54] APPLICATOR DEVICE FOR A LAYING MACHINE USING A COMPOSITE MATERIAL TAPE

[75] Inventors: Eric Poyet, Paris; Didier R. Mesnage, Saint-Cloud, both of France

[73] Assignee: Societe Anonyme dite: Aerospatiale Societe Nationale Industrielle ayant son siege social, France

[21] Appl. No.: 556,291

[22] Filed: Jul. 20, 1990

[30] Foreign Application Priority Data

Aug. 3, 1989 [FR] France ............................ 89 10496

[51] Int. Cl.⁵ .......................................... B32B 31/00
[52] U.S. Cl. .................................. 156/574; 156/582; 492/34; 492/39; 492/40; 492/59
[58] Field of Search ............... 156/574, 577, 579, 555, 156/523, 583.3, 582; 29/132, 125, 130, 121.5, 124, 116.1, 121.7

[56] References Cited

U.S. PATENT DOCUMENTS

| | | | |
|---|---|---|---|
| 3,687,781 | 8/1972 | Rawls et al. | 156/412 |
| 3,944,458 | 3/1976 | Branick | 156/412 |
| 4,111,735 | 9/1978 | Hamisch, Jr. | 156/384 |
| 4,217,951 | 8/1980 | Engel et al. | 29/124 X |
| 4,460,433 | 7/1984 | Boyd | 156/574 |
| 4,486,258 | 12/1984 | Schrotz et al. | 156/384 |
| 4,756,065 | 7/1988 | Carlson | 29/132 |
| 4,818,330 | 4/1989 | Mosburger | 156/473 |
| 4,864,343 | 9/1989 | Nelson | 354/304 |
| 4,869,774 | 9/1989 | Wisbey | 156/523 |
| 4,870,731 | 10/1989 | Yano | 29/116.1 |
| 4,954,204 | 9/1990 | Grimshaw | 156/361 |
| 5,011,563 | 4/1991 | Shinno et al. | 156/574 |

FOREIGN PATENT DOCUMENTS 0204249 12/1986 European Pat. Off.
0251964 1/1988 European Pat. Off.

Primary Examiner—David A. Simmons
Assistant Examiner—J. Sells
Attorney, Agent, or Firm—Marshall, O'Toole, Gerstein, Murray & Bicknell

[57] ABSTRACT

Applicator device for a laying machine with mobile head, for laying a composite material tape on a surface of application, said device comprising a rotary application roller carried by a mount fixed to said mobile head which applies said roller against said application surface and which advances said roller transversely to its axis of rotation so that while rolling it applies said tape on said application surface.

According to the invention, this device is characterized in that said rotary application roller comprises a resiliently flexible shaft deformable under flexion and a cylinder of resiliently compressible material fast with said shaft, each end of said shaft is connected to said mount by an end bearing, and at least one intermediate bearing is provided between said end bearings for connecting said shaft to said mount.

9 Claims, 4 Drawing Sheets

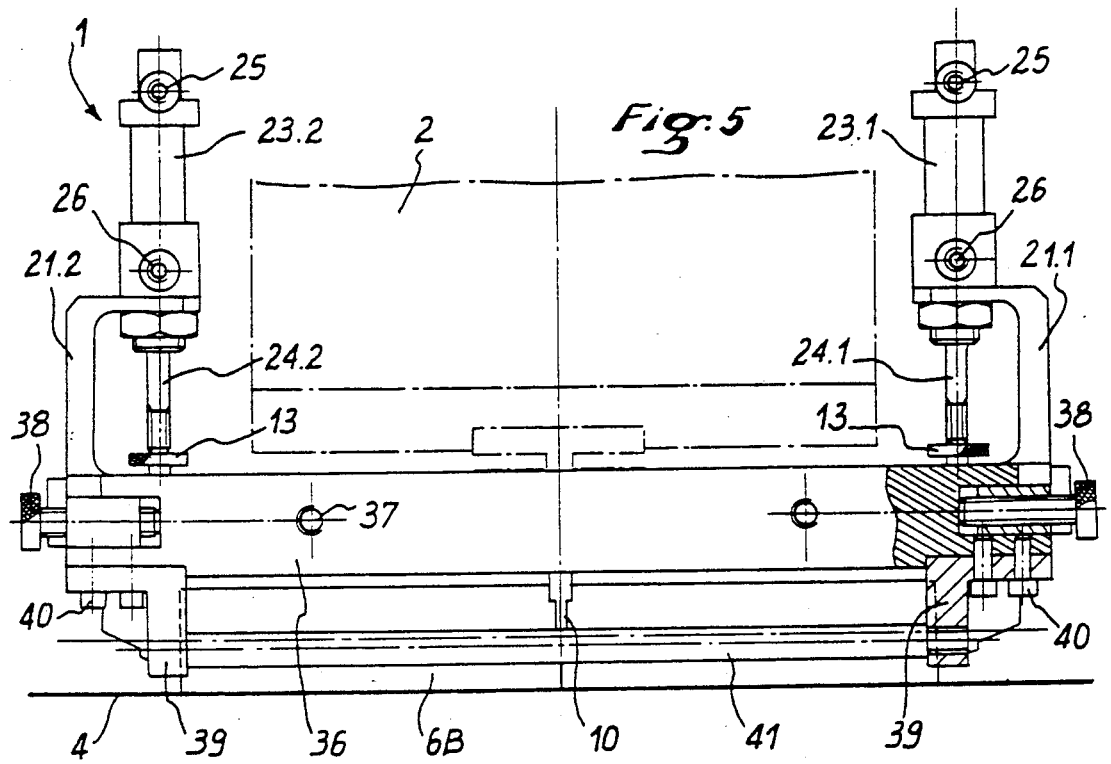
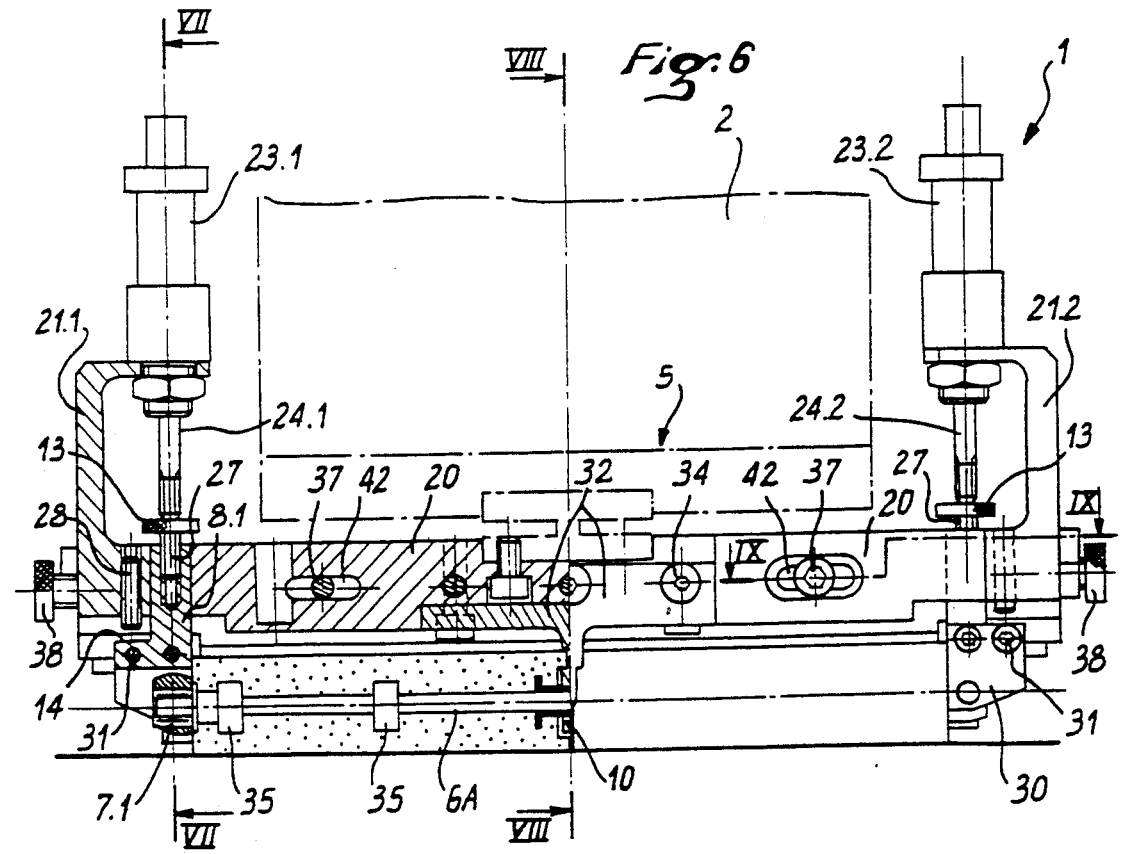

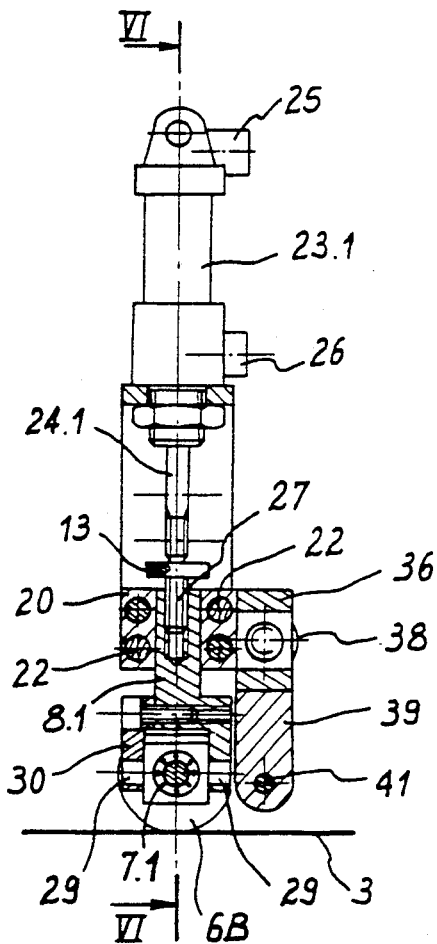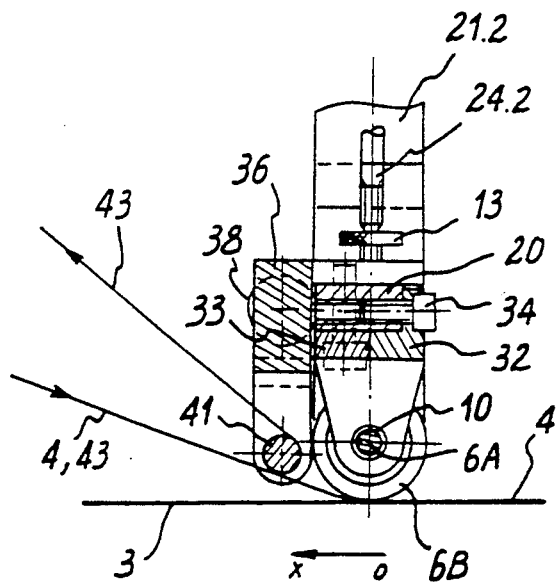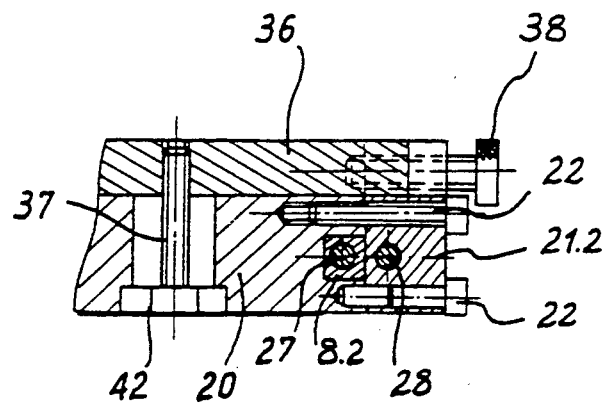
Fig. 7
Fig. 8
Fig. 9

APPLICATOR DEVICE FOR A LAYING MACHINE USING A COMPOSITE MATERIAL TAPE

BACKGROUND OF THE INVENTION

1. Field of the Invention

The present invention relates to an applicator device for a laying machine applying a composite material tape.

2. Description of the Prior Art

For forming composite material parts, such as aerodynamic surfaces of an aircraft (wings, flaps, control surfaces, etc. . . . ) a method is already known consisting in laying a ribbon of resistant fibres (glass, carbon, boron, etc. . . .) impregnated with curable resin on an application surface or mold. When the ribbon is laid, it is then subjected to known operations for polymerizing said resin, so that the desired part is then obtained. The article "Automated tape laying" by Allen J. Klein, published in the review "ADVANCED COMPOSITES", of January/February 1989 describes machines for implementing such a method.

To apply the tape on the application surface, such machines use an applicator device formed generally by a rotary roller or shoe carried by a mobile head which may be moved and oriented in all directions necessary for appropriate lapping of the application surface.

So that it can be applied on convex and/or concave application surfaces, such a rotary roller is formed so as to be deformable while intimately following the profile of said surfaces. For example, the patent U.S. application Ser. No. 4,601,775 describes such a roller having a deformable envelope connected to a rigid shaft by a swivel joint structure.

However, the other known embodiments for tape applicator rollers have limited deformability, which does not allow perfect application on very concave or very convex surfaces. In fact, if the application surface is very convex, the ends of the roller are not in contact with said surface, whereas if the application surface is very concave, it is the central part of the roller which is not in contact with said surface. In such cases of application, the only solution possible at the present time is to reduce the length of the applicator roller and consequently the width of the tape applied, which increases the number of applications of lengths of tape and so the manufacturing time and the cost of the manufactured parts.

An object of the present invention is to overcome this drawback and it relates to a device comprising an applicator roller molding itself perfectly to the profile of the application surface even in the case where the latter has very great curvatures or curvature reversal.

SUMMARY OF THE INVENTION

For this, in accordance with the invention, the applicator device for a laying machine with mobile head, for laying a composite material tape on a surface of application, said device comprising a rotary application roller carried by a mount fixed to said mobile head which applies said roller against said application surface and which advances said roller transversely to its axis of rotation so that while rolling it applies said tape on said application surface, is remarkable in that:

said rotary application roller comprises a resiliently flexible shaft deformable under flexion and a cylinder of resiliently compressible material fast with said shaft, each end of said shaft is connected to said mount by an end bearing, and at least one intermediate bearing is provided between said end bearings for connecting said shaft to said mount.

Thus, with such a structure, said applicator roller has a great facility of adaptation to the shape of the application surface, while keeping sufficient rigidity to withstand the forces resulting from its rolling over the application surface, when it is pressed thereagainst by said mobile head.

Several intermediate bearings may be provided between the end bearings for holding said shaft in position; however, tests have shown that even for rollers of considerable length, for example 150 mm, a single median intermediate bearing was sufficient.

To increase the facility of adaptation of the applicator roller to the shape of the application surface, it is advantageous for each of said end bearings to allow at least partial rotation of the corresponding end of said shaft about an axis parallel to the direction of advance of said roller. Thus, the ends of said shaft may follow the deformation of the rest of the shaft, the latter being therefore deformed continuously, over the whole of its length.

To further increase the facility of adaptation of the applicator roller to the application surface, each end bearing is mounted on a slide, capable of sliding, with respect to said mount, parallel to a direction normal to said application surface and each of said slides is pressed towards the application surface by pressure means exerting a force at least substantially constant on said slide. Thus, in addition, one can be sure that the ends of said applicator roller are in contact with the application surface.

Advantageously, stops preferably adjustable stops, are provided for limiting the travel of said slides in both directions. Thus, the possibilities of deformation of the roller can be adapted to the profile of the application surface.

Advantageously, the action of each pressure means on the corresponding slide may be interrupted, in particular for the purpose of positioning the end of the tape under the roller, before application thereof on the application surface.

Said pressure means may be formed by springs or similar. In an advantageous embodiment, each of them is in the form of a pressure cylinder, for example pneumatic, the piston rod of this cylinder being able to cooperate with the corresponding slide. In the retracted position of the rod of said cylinder, measures are taken so that there is no contact thereof with the slide, so that the roller has its spontaneous shape and it is possible to position the tape in the initial laying position under said roller. On the other hand, in the extended position of the rod of said cylinder, it is in contact with the slide, so that said cylinder may then act as a damper for the roller end to which it is connected, the instantaneous position of the rod of said cylinder resulting from the relative amplitude of the antagonistic forces which are applied thereto, on the one hand by the pressurized fluid feeding said cylinder and on the other by the application surface.

Preferably, the shaft of said roller is made of resistant fibers (glass, carbon, etc. . . . ) coated with synthetic resin and the compressible material cylinder is formed by coating said shaft with an elastomer.

BRIEF DESCRIPTION OF THE DRAWINGS

The figures of the accompanying drawings will better show how the invention may be implemented. In these figures, identical references designate similar elements.

FIG. 5 is an elevational view of the front, with parts cut away, of a practical embodiment of the applicator device of the invention.

FIG. 6 is a view, half in elevation from the rear and half in longitudinal section through line VI—VI of FIG. 7, of the applicator device of FIG. 5;

FIGS. 7, 8 and 9 are respectively sections through lines VII—VII, VIII—VIII and IX—IX of FIG. 6.

DESCRIPTION OF THE PREFERRED EMBODIMENTS

Figure 1:
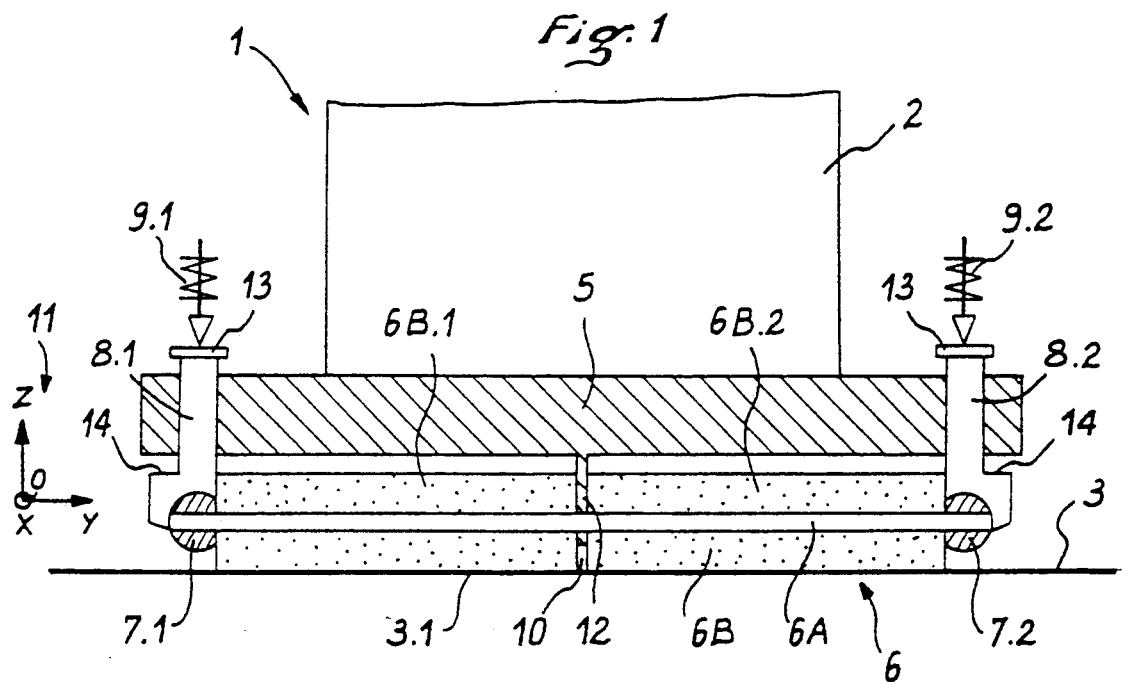
FIG. 1 is a schematic longitudinal sectional view of one embodiment of the tape applicator device according to the invention.

The tape applicator device 1 shown in FIG. 1 is mounted on the mobile head 2 (shown only schematically) of a laying machine (not shown) for laying a composite material tape 4 (only visible in FIG. 8) on an application surface 3. This laying machine and its mobile head 2 may be similar to those described in the article "Automated tape laying" mentioned above, or may be of a different type.

The applicator device 1 comprises a mount 5 fixed to the mobile head 2 in any appropriate way not shown and carrying a rotary roller 6. This rotary roller 6 is formed of a shaft 6A resiliently deformable under flexion and of great flexibility and a flexible cylindrical coating 6B of resiliently compressible material. For example, shaft 6A is made from resin coated glass fibers so as to have, besides great resilient flexibility, a good fatigue resistance, whereas the cylindrical coating 6B is made from elastomer (for example from silicone).

Each end of shaft 6A is mounted in an end bearing 7.1 and 7.2 respectively, itself mounted in a slide 8.1 or 8.2 which may slide with respect to mount 5.

Pressure means 9.1, 9.2 press said slides 8.1 and 8.2 with a force which is at least substantially constant.

The median part of shaft 6A is held in position in a fixed bearing 10 secured to mount 5.

As the system of axes 11 shown in the left-hand part of FIG. 1 illustrates, the mobile head 2 communicates to the rotary roller 6 through mount 5 an application pressure on surface 3 parallel to a direction OZ, orthogonal to said application surface 3 and perpendicular to shaft 6A, which is parallel to a direction OY. This mobile head 2 moves the whole of mount 5 and the rotary roller 6 so that said rotary roller 6 rolls over the application surface 3 while moving in direction OX, perpendicular to OZ and OY. In FIG. 1, the direction OX is perpendicular to the plane of the drawing.

The bearings 7.1 and 7.2, for example of the pivot type, allow the ends of shaft 6A to be deformed about the direction OX. Slides 8.1 and 8.2 are mobile parallel to the direction OZ and the force which is applied thereto by the pressure means 9.1 and 9.2 is also parallel to this direction OZ. Preferably, said pressure means 9.1 and 9.2 are controlled so that they only apply their pressure to slides 8.1 and 8.2 when roller 6 is bearing against the application surface 3. Thus, roller 6 keeps a spontaneous rectilinear neutral position when it is not applied against surface 3, which facilitates the operation for initial positioning of tape 4 under roller 6, prior to a laying sequence.

It will be noted that the fixed bearing 10 prevents the median portion of shaft 6A from moving parallel to direction OX during a laying operation. The presence of such a fixed median bearing 10 means that the flexible cylindrical coating 6B is made in two parts 6B1 and 6B2 separated from each other by a slit 12. This slit 12 is not prejudicial to the quality of application of the tape, for it is filled by crushing of portions 6B1 and 6B2 during application of roller 6 against the application surface 3.

Stops 13, carried by slides 8.1 and 8.2 and capable of cooperating with mount 5, limit the travel of said slides (parallel to the direction OZ) towards the application surface 3. Other stops 14, also carried by slides 8.1 and 8.2 and able to cooperate with mount 5, limit the travel of said slides in the direction opposite to the application surface 3.

It will be readily understood that, with the structure described and shown, roller 6 has great deformation flexibility in plane YOZ, so that it may adapt itself to the profile of the application surface 3, while having great rigidity in plane XOY, so that it is insensitive to the forces (parallel to OX) to which it is subjected when the mobile head 2 moves it and presses it against the application surface 3.

In FIG. 1, the applicator device 1 has been shown bearing against a flat portion 3.1 of the application surface 3. It can be seen in this case that shaft 6A is rectilinear and that slides 8.1 and 8.2 are in an intermediate position for which stops 13 and 14 are spaced away from mount 5. In this FIG. 1, as well moreover as in FIGS. 2 to 4, slit 12 between the parts 6B1 and 6B2 of roller 6B has been shown, although it is in actual fact filled following crushing of said roller.

Figure 2:
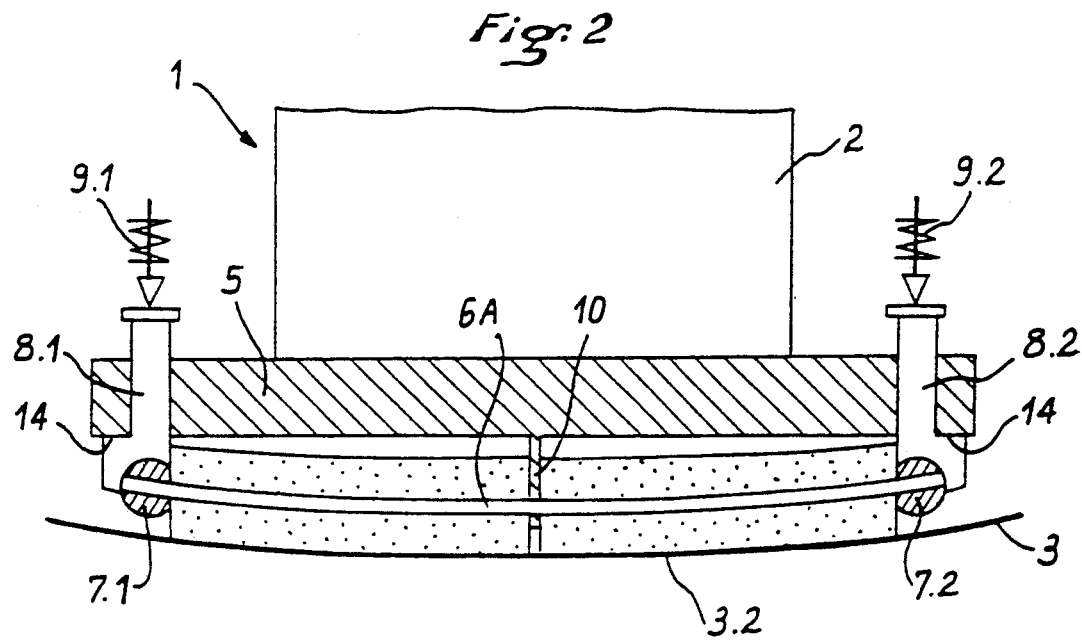
FIGS. 2, 3 and 4 illustrate, schematically in section, the behavior of the applicator device of FIG. 1, respectively on concave and convex surfaces and surfaces with curvature reversal.

FIG. 2 illustrates schematically application of device 1 on a concave portion 3.2 of the application surface 3. In this case, shaft 6A is deformed on each side of the fixed median bearing 10 to follow the concavity of portion 3.2. Such deformation of shaft 6A is promoted because bearings 7.1 and 7.2 rotate spontaneously to allow deformation of the ends of said shaft 6A by partial rotation in an appropriate direction about the axis of direction OX. If, as is shown in FIG. 2, the concavity of part 3.2 is great, slides 8.1 and 8.2 are, by reaction of surface 3 on roller 6, pushed back against the action of the pressure means 9.1 and 9.2 until stops 14 come into abutment against mount 5.

Figure 3:
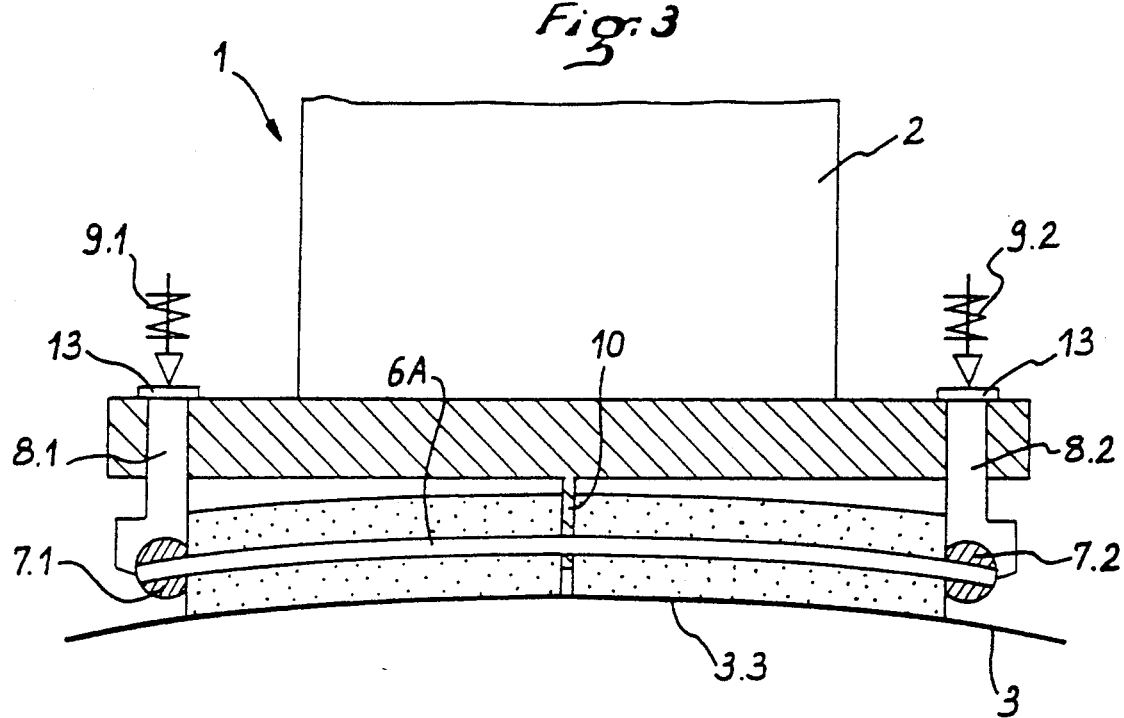

When, as is shown in FIG. 3, device 1 is applied on a convex portion 3.3 of the application surface 3, shaft 6A is deformed in the direction opposite that shown in FIG. 2, to follow the convexity of this portion 3.3. Here again, deformation of shaft 6A occurs on each side of the fixed bearing 10 and is promoted by adequate and spontaneous rotation of bearings 7.1 and 7.2 about the direction OX. If the convexity of portion 3.3 of surface 3 is great (case shown in the figure), slides 8.1 and 8.2 are pushed back by the pressure means 9.1 and 9.2 until stops 13 come into abutment against mount 5.

Figure 4:
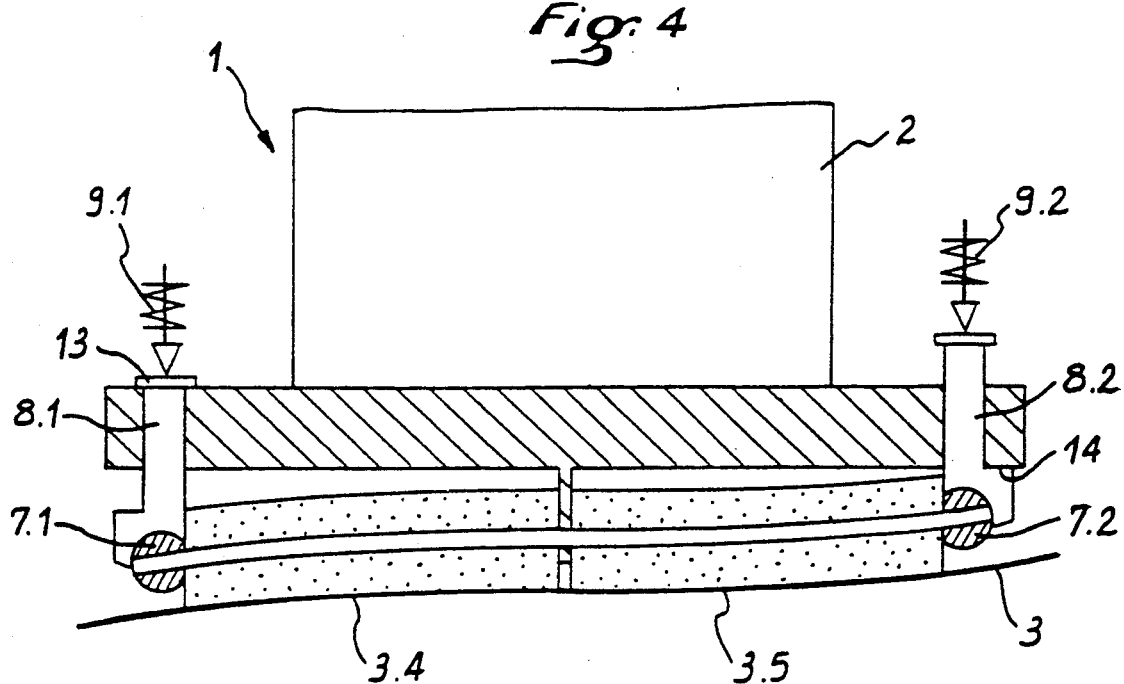

In addition, as is shown in FIG. 4, if the application surface 3 has a reversal of curvature so as to comprise a convex portion 3.4 (at the left) joined to a concave portion 3.5 (at the right) and if device 1 is applied astride this curvature reversal, roller 6 of this device may be deformed so as to adapt itself to this curvature reversal. The portion of shaft 6A situated above the convex portion 3.4 adapts itself to the convexity thereof as illustrated in FIG. 3, whereas the portion of shaft 6A situated above the concave portion 3.5 adapts itself to the concavity of said portion as illustrated in FIG. 2. This double deformation in opposite directions is promoted by appropriate movement of slides 8.1 and 8.2 and by adequate rotation of bearings 7.1 and 7.2. As before, if the convexity of portion 3.4 and the concavity of portion 3.5 are great, the stop 13 of slide 8.1 and the stop 14 of slide 8.2 allow contact with mount 5.

In the embodiment of the applicator device 1 shown in FIGS. 5 to 9, mount 5 comprises a bar 20 at the ends of which are fixed two columns 21.1 and 21.2, by means of screws 22. Each column 21.1 and 21.2 serves for supporting a pneumatic pressure cylinder 23.1, 23.2, forming respectively the pressure means 9.1 and 9.2. Each pressure cylinder 23.1, 23.2 comprises a rod 24.1, 24.2 which may occupy either a retracted position (not shown in the figures) or an extended position (shown in the figures) under the action of compressed air introduced into the control orifices 26 or 25.

Slides 8.1 and 8.2 have a polygonal section (square in the figure) and may slide with an easy fit in a guide of corresponding section provided in said bar 20 and columns 21.1 and 21.2. Stops 13 are formed by the screw head 27 which can be screwed into and out of the corresponding slide 8.1 or 8.2. Thus, screws 27 allow a variable stop system to be formed between slide 8.1 (or 8.2) and the corresponding cylinder rod 24.1 (or 24.2). Furthermore, screws 28 are provided in columns 21.1 and 21.2 for forming, with stops 14 of slides 8.1 and 8.2, an adjustable stop system. Consequently, by adjusting the position of screws 27 and 28, it is possible to adjust the length of the travel of slides 8.1 and 8.2 in both directions.

The pivot bearings 7.1 and 7.2, for the ends of shaft 6A, are fixed in housings in said slides 8.1 and 8.2 by means of studs 29, said housings being closed by covers 30 fixed by screws 31.

The intermediate median bearing 10 is formed between two parts 32 and 33, fixed to bar 20 by screws 34.

Shaft 6A has rings 35 for reinforcing the connection between said shaft 6A and the resiliently compressible material cylinder 6B.

In addition, along bar 20, in front of the latter with respect to the direction of advance of the applicator device, is fixed a bar 36, by means of clamping screws 37, able to slide through apertures 42 provided in said bar 20. The position of bar 36 with respect to bar 20 is adjustable longitudinally (i.e. transversely to the tape to be laid) by means of adjustment screws 38. At its ends, bar 36 has bearings 39 fixed thereto by screws 40. Between bearings 39 of bar 36 is mounted a rotary shaft 41 for a protective film 43 covering tape 4.

Thus, with pressure cylinders 23.1, 23.2 controlled so that their rods 24.1, 24.2 are in the retracted position, head 2 brings the applicator device above the reference position of surface 3 at which the laying is to begin. The tape, coming from a reel (not shown) is separated or not from its protective film 43, which is passed over the rotary shaft 41 to be wound on a reel (not shown). Tape 4, freed of its protective film 43, is applied on the application surface 3 by roller 6B, through the action of head 2. Then, pressure cylinders 23.1, 23.2 are controlled so that their rods 24.1, 24.2 pass to the extended position pressing slides 8.1 and 8.2 towards the application surface 3. The applicator device 1 is then ready for laying to take place automatically, as described in the above article "Automated tape laying".

What is claimed is:

1. Applicator device for a laying machine with mobile head, for laying a composite material tape on a surface of application, said device comprising a rotary application roller carried by a mount fixed to said mobile head which applies said roller against said application surface and which advances said roller transversely to its axis of rotation so that while rolling it applies said tape on said application surface, wherein:

said rotary application roller comprises a resiliently flexible shaft deformable under flexion and a cylinder of resiliently compressible material fast with said shaft, each end of said shaft is connected to said mount by an end bearing, and at least one intermediate bearing is provided between said end bearings which connects said shaft to said mount.

2. The device as claimed in claim 1, wherein each of said end bearings allows the corresponding end of said shaft to be deformed in rotation about an axis parallel to the direction of advance of said roller.

3. The device as claimed in claim 1, wherein each end bearing is mounted on a slide which is able to slide, with respect to said mount, parallel to a direction normal to said application surface and each of said slides is pressed towards said application surface by pressure means exerting a force at least substantially constant on said slide.

4. The device as claimed in claim 3, comprising stops for limiting the travel of said slides in both directions.

5. The device as claimed in claim 3, wherein the action of each pressure means on the corresponding slide is selectively controllable.

6. The device as claimed in claim 3, wherein each pressure means is a pressure cylinder.

7. The device as claimed in claim 1, wherein the shaft of said roller is made from resistant fibers coated with synthetic resin.

8. The device as claimed in claim 7, wherein said compressible material cylinder is formed by coating said shaft with an elastomer.

9. The device as claimed in claim 2, wherein said end bearings are of the pivot type.

* * * * *